April 25, 1961  G. A. LYON  2,981,566
WHEEL COVER
Filed July 2, 1956
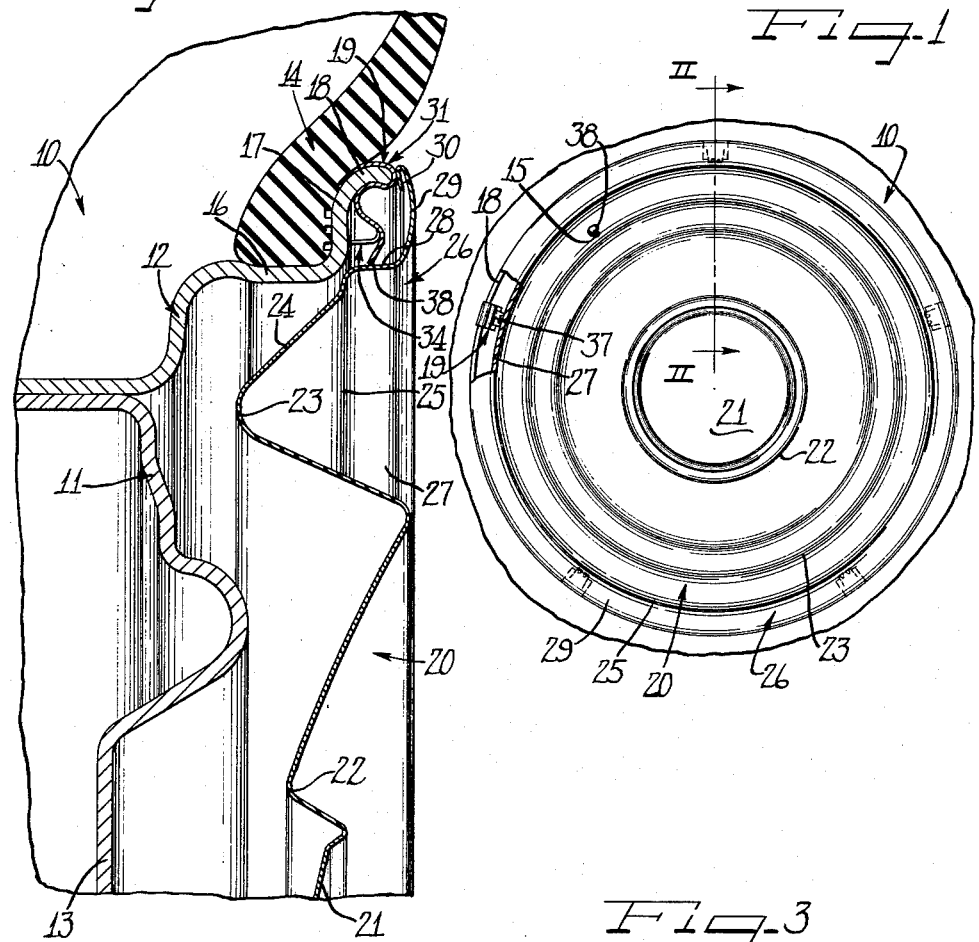
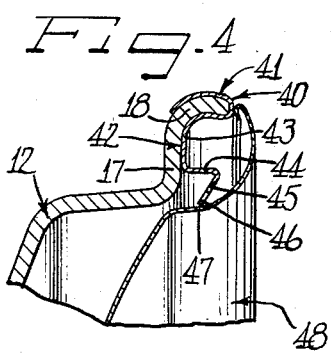
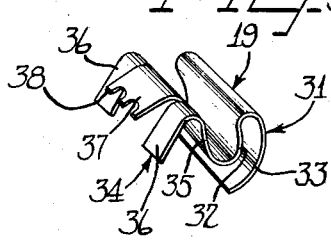
Inventor
George Albert Lyon

United States Patent Office 2,981,566
Patented Apr. 25, 1961

2,981,566
WHEEL COVER
George Albert Lyon, 13881 W. Chicago Blvd., Detroit 28, Mich.
Filed July 2, 1956, Ser. No. 595,474
3 Claims. (Cl. 301—37)

This invention relates generally to wheel structures and more particularly to a new and improved manner of retaining a wheel cover member in protective retained overlying disposition upon a vehicle wheel.

The wheel cover of the present invention is intended to be retained on a tire rim of a vehicle wheel by means of circumferentially spaced spring clips each of which has means for grasping the terminal rim flange to maintain the clip in assembly therewith.

Each of the clips has been provided with struckout or depending finger-like extensions. These extensions are adapted to cooperate with a shoulder on a wheel cover to maintain the cover on the vehicle wheel in resilient snap-on, pry-off engagement with the vehicle wheel.

Accordingly, an object of this invention is to provide a new and improved wheel structure including a wheel having a tire rim, clips capable of retaining themselves on the rim, and a cover member retained by the clips on the wheel.

Another object of this invention is to provide a new and improved clip construction having means to self retain the clip on the terminal rim flange of a tire rim and having resilient finger means for retaining a cover member upon a vehicle wheel.

Yet another object of this invention is to provide a new and improved highly ornamental protective wheel cover member for overlying disposition upon a vehicle wheel.

According to the general features of this invention there is provided in a wheel structure, a wheel including a tire rim having a generally radial rim flange connected at its outer end to a generally axial terminal rim flange, circumferentially spaced retaining members carried on the tire rim, the clips having a looped terminal including radially spaced inner and outer legs for grasping the terminal rim flange and maintaining the clips in assembly therewith, the inner leg connected to a second looped portion, the second looped portion with at least one finger extension extending therefrom and terminating in a terminal flange in backed up engagement against the radial rim flange, and a wheel cover section overlying the wheel and having a cover portion in snap-on, pry-off resilient tensioned engagement with the finger extensions.

A still further object of this invention is to provide a new and improved wheel cover member and spring retaining clips which lend themselves to economical manufacture on a large production basis and which are adopted to efficiently co-act together in the maintenance of the cover in detachable assembly upon a vehicle wheel.

Other objections and features of the present invention will more fully become apparent in view of the following detailed description taken in conjunction with the accompanying sheet of drawings illustrating a single embodiment and in which:

Figure 1 is a side elevation of my wheel structure;

Figure 2 is an enlarged fragmentary cross-sectional view taken substantially on line II—II of Figure 1 looking in the direction indicated by the arrow;

Figure 3 is an enlarged perspective view of my spring clip; and

Figure 4 is an enlarged fragmentary cross-sectional view similar to Figure 2 but illustrating a modified form of my invention.

As shown on the drawings:

The reference numeral 10 indicates generally my wheel structure including a wheel having body and rim parts 11 and 12 respectively. The body part 11 includes a bolt-on flange 13 which may have apertures for cooperation with lugs on an axle of an automobile vehicle. Nuts may be threaded on the lugs to clamp the body part 11 to the axle to maintain the wheel in assembly therewith in a conventional manner.

Carried upon the tire rim 12 is a tire assembly 14. The tire assembly 14 may either be a pneumatic tire and tube assembly or a tubeless tire assembly and in either case is adapted to have air inserted through valve stem 15 (Figure 1) to enable ready inflation of the tire.

The tire rim 12 includes a generally axially extending intermediate flange 16 and is joined at its outer margin to a generally radially outwardly extending annular rim flange 17. The rim flange 17 is in turn joined at its radially outer margin to a generally axially outwardly extending terminal flange 18.

According to this invention, circumferentially spaced clips 19 have been provided and which are adapted to self retain themselves on the terminal rim flange 18. The clips 19 may be made from any suitable material although it will be appreciated excellent results may be attained through making the clips from spring steel, since this type of steel possesses highly desirable resilient characteristics.

Protectively overlying the wheel is my novel wheel cover member or section 20. The cover of the present invention has been shown as a full disk type of cover and lends itself to be made from any suitable material such as aluminum, stainless steel, and the like. The cover 20 includes a central crown 21 and which is bounded at its outer perimeter successively by annular grooved portions 22 and 23. The grooved portion 23 overlies the junction of the rim and body parts. The grooved portion 23 includes a radial wall portion 24 which terminates in an annular rib 25 at its outer margin generally opposite the junction of the rim flanges 16 and 17. The annular rib 25 in turn merges with outer cover margin 26. Cover margin 26 includes a generally radially and axially outwardly extending cover portion 27 having a radially outwardly facing annular shoulder 28 and terminates in a generally radially outwardly extending flange portion 29 overlying the terminal rim flange 18. The margin of the cover 26 has been provided with an annular pry-off bead 30.

The clips of the present invention have each been provided with a clip retaining portion or looped terminal portion 31. The looped portion 31 includes radially spaced radially inner and outer legs 32 and 33, leg 33 being elongated. Both of the legs are generally arcuate in configuration in order to nestingly cooperate with inner and outer faces or sides of the arcuate terminal rim flange 18. Each of the arcuate legs are normally inclined slightly towards one another so that they must be sprung apart slightly in order for them to slip over and grasp the terminal rim flange 18 when assembled therewith. Connected at the generally radially and axially inner end of leg 32 is a terminal looped portion 34 which opens axially rearwardly in the same manner as the looped portion 31. The looped portion 34 includes a generally radially inwardly and axially outwardly extending leg 35 and generally axially inwardly extending terminal legs 36. Struck-out from the terminal looped portion 34 between legs 36 are resilient finger extensions 37, having gripping teeth 38. The clip 19 has been radially related inner and outer first and second looped portions opening in axially opposite directions, the outer looped portion being the looped portion 31 and the inner or second looped portion being defined by legs 32 and 35. The clips 19 each comprise a strip of material with its radially inner and outer free ends engaged against the tire rim on opposite sides of the terminal rim flange 18. The outer end comprises leg 33 and the inner end comprises the leg 36.

The clips may be assembled upon the terminal rim flange by slightly springing the legs 32 and 33 apart and thereafter urging the looped portion 31 over the arcuate circumferentially curved terminal rim flange 18. As the looped portion 31 is engaged upon the terminal rim flange 18, the elongated leg 33 is slid underneath the tire in such a manner that the tire is adapted at all times to bear under tension thereagainst when the clip is in full assembly upon the wheel. When the clip is in full assembly the legs 36 are bottomed against the rim flange 17 to provide a rigid back-up for the finger extensions 37.

The cover member 20 may be assembled upon the wheel by initially aligning the valve stem 15 with opening 38 on the cover and upon the application of an axially inward force the extensions 37 or the teeth 38 are cammed over the rib 25 in tensioned cover retaining engagement with the annular shoulder 28. When the cover is in full assembly upon the wheel, the bead 30 is bottomed against the looped portion 31 to maintain the looped portion 31 in bottomed engagement upon the terminal rim flange 18.

In view of the foregoing it will be appreciated the tire and the tensioned engagement between the finger extensions 37 and the annular shoulder 28 cooperate together to augment the retaining action developed by the looped portion 31 all to the end of securely maintaining the clips in assembly with the rim flange 18.

The cover may be removed by inserting a suitable pry-off tool underneath the bead 30 and upon twisting the tool the cover may be detached from its retained co-operation with the extensions 37. The clips 19 may be removed by prying them off of the terminal rim flange 18.

Shown in Figure 4 mounted on the terminal rim flange 18 of the tire rim 12 is my modified spring clip 40. The clip 40 has a clip retaining portion or looped portion 41, similar to portion 31 shown in the first form of my invention. The portion 41 is adapted to retainingly engage upon the terminal rim flange in the same manner as in the first form of my invention. Connected and disposed radially inwardly of the portion 41 and partially defined by portion 41 is an inner looped portion 42 including a generally radially inwardly extending leg 43 and a generally axially outwardly extending leg 44. Connected at the axially outer end of the leg 44 is a generally axially and radially inwardly extending resiliently deflectable yieldable finger extension 45 including teeth 46. The teeth 46 are adapted to bite into annular cover portion 47 with cover 48 in much the same manner as in the first form of my invention. The clip 40 also has radially related oppositely opening looped portions including outer looped portion 41 and inner looped portion 42. The clips 40 each comprise a strip of material with its radially inner and outer free ends disposed on opposite sides of the terminal rim flange 18. The outer end comprises a portion of the looped portion 41 and the inner end comprises the teeth 46.

It should be noted the leg 43 is adapted to bottom against the radial rim flange 17 to provide a rigid back up for the teeth 46.

In this form of the invention a vehicle tire (not shown) is adapted to bear against the looped portion 41 in the same manner as is shown in Figure 2. Accordingly, the clip action of the looped portion 41 will be augmented not only by the tire bearing thereagainst but also by reason of the tension developed between the cover 48 and the extension 45. The application of the clips to the wheel and the cover to the clips along with their removal may be accomplished in much the same manner as in the first form of my invention.

It will be understood that modifications and variations may be effected without departing from the scope of the novel concepts of the present invention.

I claim as my invention:

1. In a wheel structure including a tire rim having a generally radially outwardly extending flange joining a generally axially outwardly extending terminal flange, circumferentially spaced retaining clips each having a looped portion including radially inner and outer legs disposed for grasping said terminal flange therebetween and maintaining the clips in assembly therewith, said inner legs having extending generally radially inwardly therefrom a cover retaining portion which engages said radially extending rim flange and has a generally axially extending leg disposed in generally backed up relation to said radial rim flange, said radially inner portion having extending from the axially outer side thereof cover retaining finger extensions projecting radially and axially inwardly from said axially extending leg and having inner end terminals, and a wheel cover member having a generally axially extending portion thereof retainingly engageable in press-on, pry-off resiliently tensioned retaining engagement with said finger extension terminals.

2. A wheel structure as defined in claim 1 wherein said generally axially extending radially inner portion legs project generally axially inwardly from the axially outer sides of said radially inner portions and engage endwise against said radially extending rim flange.

3. A wheel structure as defined in claim 1 wherein said axially extending legs of the radially inner portions of the clips project from a generally radially inwardly extending leg that engages against the radially extending rim flange and the finger extension in each instance extends from the axially outer end of the axially extending leg.

References Cited in the file of this patent

UNITED STATES PATENTS

| | | |
|---|---|---|
| 2,221,747 | Turner | Nov. 19, 1940 |
| 2,351,655 | Aske | June 20, 1944 |
| 2,621,978 | Lyon | Dec. 16, 1952 |
| 2,644,721 | Grimshaw | July 7, 1953 |
| 2,683,629 | Lyon | July 13, 1954 |
| 2,724,882 | Poupitch | Nov. 29, 1955 |
| 2,749,184 | Wood | June 5, 1956 |
| 2,749,186 | Wood | June 5, 1956 |